US012579108B1

(12) United States Patent
McGehee et al.

(10) Patent No.: US 12,579,108 B1
(45) Date of Patent: Mar. 17, 2026

(54) SYNCHRONOUS DATABASE DATA PERSISTENCE

(71) Applicant: Amazon Technologies, Inc., Seattle, WA (US)

(72) Inventors: Kevin R McGehee, Shoreline, WA (US); Stefan Mueller, Vancouver (CA); Itay Maoz, Bellevue, WA (US); Jean Maurice Guy Guyader, Vancouver (CA); Aseem Paul Singh Cheema, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 17/115,563

(22) Filed: Dec. 8, 2020

(51) Int. Cl.
| | |
|---|---|
| *G06F 15/16* | (2006.01) |
| *G06F 11/30* | (2006.01) |
| *G06F 16/16* | (2019.01) |
| *G06F 16/17* | (2019.01) |
| *G06F 16/178* | (2019.01) |
| *G06F 16/182* | (2019.01) |

(52) U.S. Cl.
CPC ........ *G06F 16/178* (2019.01); *G06F 11/3006* (2013.01); *G06F 16/164* (2019.01); *G06F 16/1734* (2019.01); *G06F 16/1844* (2019.01)

(58) Field of Classification Search
None
See application file for complete search history.

(56) References Cited

U.S. PATENT DOCUMENTS

| | | | |
|---|---|---|---|
| 8,543,379 B1* | 9/2013 | Michelsen | ............ G06F 40/205 |
| | | | 704/9 |
| 2014/0156618 A1* | 6/2014 | Castellano | .......... G06F 16/2308 |
| | | | 707/703 |
| 2017/0078387 A1* | 3/2017 | Xu | .......................... H04L 12/18 |

OTHER PUBLICATIONS

Ahmad et al. Transactional Failure Recovery for a Distributed Key-Value Store. Middleware 2013, pp. 267-286. (Year: 2013).*
Hemmatpour et al. Kanzi: A Distributed, In-memory Key-Value Store. Middleware Posters and Demos 2016, pp. 1-2. (Year: 2016).*
Jackson. An introduction to APIs and messaging. https://developer.ibm.com/articles/introduction-apis-and-messaging/, 2019, pp. 1-7. (Year: 2019).*
Gupta. Data synchronization in SQL Server Always On Availability Groups, 2019, pp. 1-8, https://www.sqlshack.com/data-synchronization-in-sql-server-always-on-availability-groups/. (Year: 2019).*

* cited by examiner

*Primary Examiner* — Alex Gofman
*Assistant Examiner* — Shelly X Qian
(74) *Attorney, Agent, or Firm* — Davis Wright Tremaine LLP

(57) ABSTRACT

A database system writes data to a volatile memory and generates metadata associated with the data written to the volatile memory. The database system stores a message usable to confirm that the data was written in the volatile memory and links the metadata to the message. A data structure receives the data and the metadata and stores at least the data. A service managing the data structure provides a confirmation that the data was stored by the data structure. The confirmation includes at least the metadata associated with the data. The database system, in response to the confirmation that the data was obtained by the data structure, identifies the stored message using the metadata included with the confirmation and then releases the message.

23 Claims, 6 Drawing Sheets

300

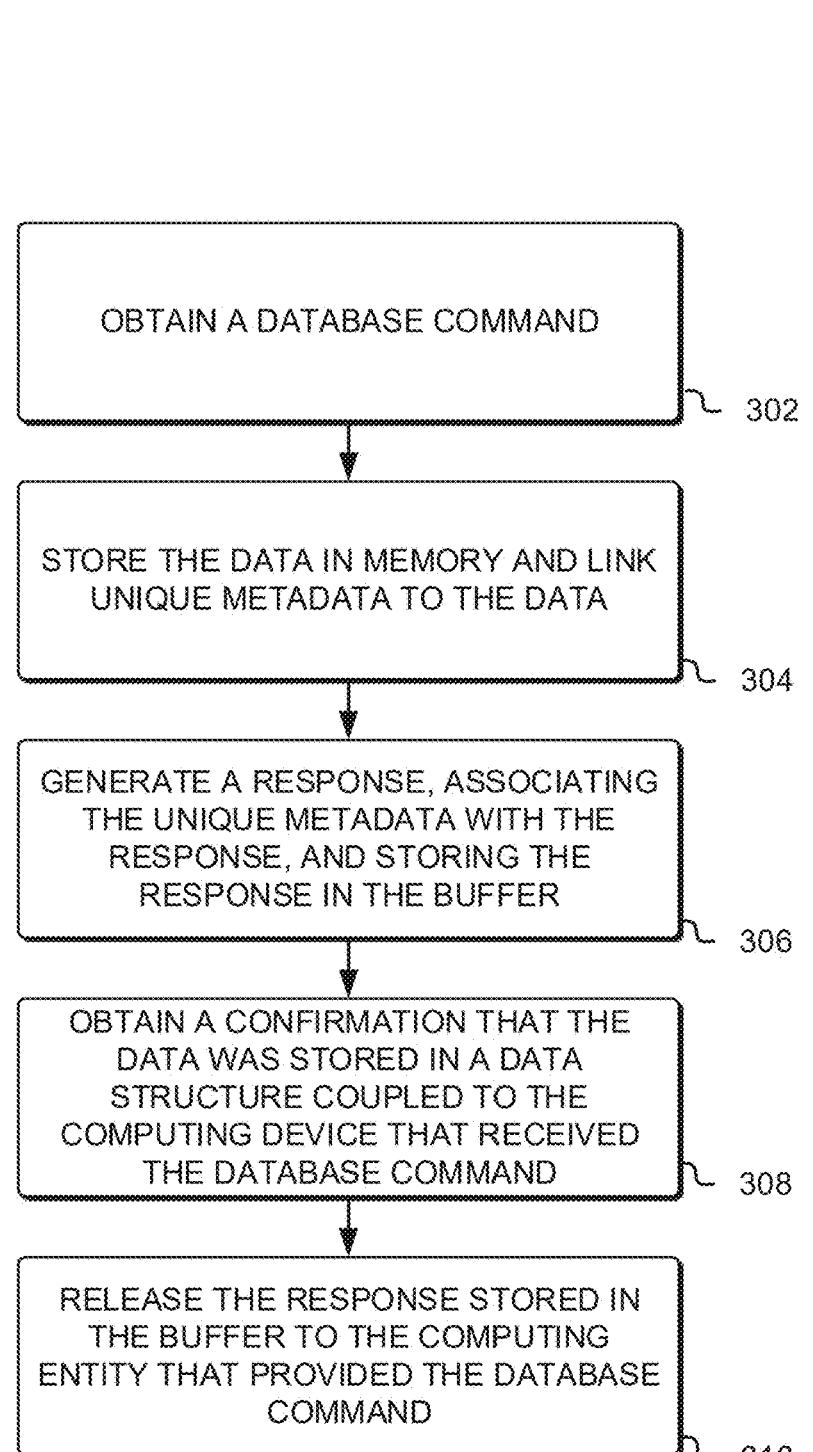

OBTAIN A DATABASE COMMAND

302

STORE THE DATA IN MEMORY AND LINK UNIQUE METADATA TO THE DATA

304

GENERATE A RESPONSE, ASSOCIATING THE UNIQUE METADATA WITH THE RESPONSE, AND STORING THE RESPONSE IN THE BUFFER

306

OBTAIN A CONFIRMATION THAT THE DATA WAS STORED IN A DATA STRUCTURE COUPLED TO THE COMPUTING DEVICE THAT RECEIVED THE DATABASE COMMAND

308

RELEASE THE RESPONSE STORED IN THE BUFFER TO THE COMPUTING ENTITY THAT PROVIDED THE DATABASE COMMAND

OBTAIN A COMMAND TO STORE DATA

402

SEND THE DATA AND METADATA
ASSOCIATED WITH THE DATA TO A DATA
STORE

404

COMMUNICATE THE DATA TO A MEMORY

406

GENERATED CONFIRMATION THAT THE
DATA WAS STORED IN THE DATA
STRUCTURE

408

RELEASE A MESSAGE TO CONFIRM THE
COMMAND TO STORE THE DATA

410

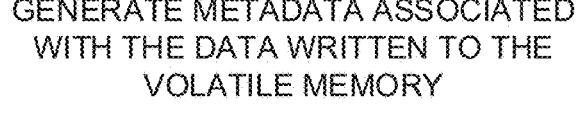

500

WRITE DATA IN A VOLATILE MEMORY

502

GENERATE METADATA ASSOCIATED
WITH THE DATA WRITTEN TO THE
VOLATILE MEMORY

504

STORE A MESSAGE USABLE TO
CONFIRM THAT THE DATA WAS WRITTEN
TO THE VOLATILE MEMORY

506

COMMUNICATE THE DATA AND THE
METADATA TO A DATA STRUCTURE TO
STORE THE DATA

508

OBTAIN A CONFIRMATION THAT THE
DATA WAS STORED BY THE DATA
STRUCTURE, THE CONFIRMATION
INCLUDING THE METADATA ASSOCIATED
WITH THE DATA

510

IDENTIFY THE STORED MESSAGE USING
THE METADATA INCLUDED WITH THE
CONFIRMATION AND RELEASE THE
MESSAGE

Network

Application
Server(s)

606

Web
Server(s)

608,
104,
202

Production

Log

User
Information 610, 106, 214

612

614

616

SYNCHRONOUS DATABASE DATA PERSISTENCE

BACKGROUND

Organizations invest in technologies that provide customers with access to computing systems and resources of those systems. Within multi-tier ecommerce systems, combinations of different types of resources may be allocated to customers and/or their applications, such as whole physical or virtual machines, CPUs, memory, network bandwidth, or input/output (I/O) capacity.

The computer systems and associated resources that provide services to customers may employ various techniques to preserve customer data and customer experience during periods when the computer systems are overloaded or even experiencing failures. In general, a computer system is considered to be in an overloaded or failing state if it is not able to provide the expected quality of service for at least some portion of received customer requests. Common solutions applied by overloaded or failing computer systems include denying service to customers.

To protect customer data against overloads and failures, customer data is often replicated across different computer systems to create enhanced access to the customer data. However, creating consistent replicas of customer data across a plurality of computer systems requires additional resources and requires consensus on customer data across the plurality of computer systems. While such systems may maintain the integrity of customer data and mitigate the risk of loss, there may be a reduction in customer experience and delay in customers obtaining their data. Furthermore, replicas of customer data may be incomplete under some operational circumstances.

BRIEF DESCRIPTION OF THE DRAWINGS

Various techniques will be described with reference to the drawings, in which:

FIG. 3 illustrates a flow diagram including various processing acts, implemented by a system environment with one or more computing devices or nodes, which provide synchronous data replication, in accordance with at least one embodiment;

FIG. 5 illustrates a flow diagram including various processing acts, implemented by a system environment with one or more computing devices or nodes, which provide synchronous data replication, in accordance with at least one embodiment.

DETAILED DESCRIPTION

Figure 1:
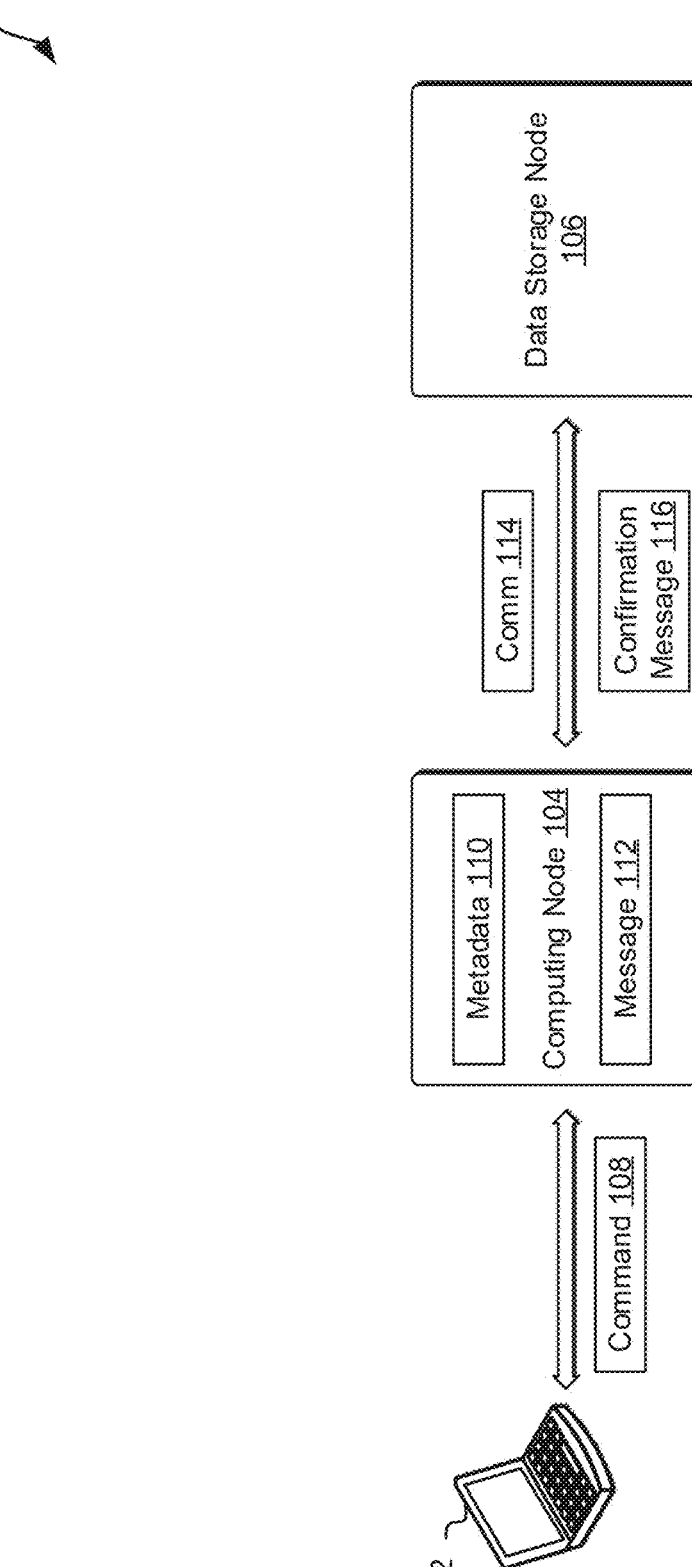
FIG. 1 illustrates a computing environment that implements one or more disclosed techniques that provide synchronous data replication, in accordance with at least one embodiment.

In an example of a database system that implements asynchronous replication of data stored on a primary node, the database system is augmented, converted, or otherwise configured to provide synchronous replication of data stored on the primary node. In another example, a database system is initially implemented with the described synchronous replication techniques. The described synchronous replication techniques provide consistent data sets on the primary node and replica nodes coupled to the primary node. In an example, the synchronous replication techniques dispose a data structure between the primary node and secondary nodes that include replicated data stored by the primary node. The data structure can be, in an example, a ledger database that provides a transparent, immutable, and cryptographically verifiable transaction log to track received and stored data.

A primary node of a database system allows client connections. Specifically, a client, such as a software client or hardware client, can couple to one of several input/output (I/O) ports of the primary node. The client communicates database commands to the primary node over at least one of the I/O ports. In an example, the primary node can receive or obtain a database command to write data to volatile memory of the primary node. The command received by the primary node can include the data to write to the volatile memory of the primary node. In an example, the data received with the command is a key-value pair, where the value portion of the pair is the data written to the volatile memory of the primary node.

Based on the received command, the primary node writes the received data to the volatile memory. In some examples, the primary node allows clients to query the data stored in the volatile memory. The primary node can assign a unique value to the data stored in the volatile memory. In an example, the unique value can be determined from a counter that increments by some value, such as one, when data is received by the primary node. In an example, the unique value can be an offer identifier (ID). The offer ID can be a string generated by the primary node when the data is received and/or written to the volatile memory. The primary node can generate multiple unique values, such as the offer ID and the unique value determined from the counter. The unique value, or multiple unique values in some examples, assigned to the data stored in the volatile memory is also referred to herein as metadata linked to the data stored in the volatile memory. Thus, the metadata can include the unique value(s) associated with the data stored in the volatile memory. The metadata can also include other information to identify the data stored in the volatile memory. The information to identify the data can include a hash value, an integer value, an alphanumeric value, and the like. The information to identify the data can be packaged with the data before the data is received by the primary node.

The primary node can generate a message used to confirm that the primary node obtained the command to write the data to volatile memory. The primary node can generate the message to include the unique value linked to the data stored in the volatile memory. The unique value can be included in the message. Alternatively, the unique value can be associated with the message, such as stored in a database table that links the unique value to the message. The message can be conveyed or otherwise communicated to a client that generated or otherwise provided the command to write the data to the volatile memory of the primary node. The message can serve as a confirmation to the client that the command was received and processed by the primary node. Furthermore, the message can serve as a confirmation to the client that the data associated with the command was stored in the volatile memory of the primary node.

The primary node can place the message in a computerized storage awaiting communication to the client that generated or otherwise provided the command to write the data to the volatile memory of the primary node. The message is held in the computerized storage temporarily based on the following.

In an example, in addition to storing the data associated with the write command received from the client, the primary node also conveys the data to a service managing a data structure coupled to the primary node. In an example, the primary node conveys the data and the right command to the service managing the data structure coupled to the primary node. As indicated, the data structure, in an example, is a ledger database that provides a transparent, immutable, and cryptographically verifiable transaction log to track received and stored data. In addition to conveying the data to the service managing the data structure, the primary node also communicates the unique value(s), such as an offset value and/or the offer ID, that the primary node generated when the data was received and stored in the volatile memory of the primary node. The data structure stores the received data, and the service accounts for the stored data in its transaction log by at least writing unique value therein and assigning an identifier to the unique value associated with the data received and stored in the data structure.

The service maintaining or managing the data structure, such as a database service of an online service provider, can generate a confirmation message usable to confirm that the data was successfully stored in the data structure. In an example, the confirmation message can include the unique value received by the service that manages the data structure. The confirmation message can include additional data, such as the identifier associated with the unique value and the data stored in the data structure. In an example, the confirmation message includes a plurality of unique values, such as the offset value and the offer ID.

The service managing the data structure communicates the generated confirmation message to the primary node. The primary node can analyze the confirmation message to determine the unique value(s) included in the confirmation message. In an example, the primary node uses the unique value included in the confirmation message to search for a stored message that has an associated unique value that matches the unique value included in the confirmation message.

For example, as described in the foregoing, the primary node can generate a message used to confirm that the primary node obtained the command to write the data to volatile memory. The primary node can generate the message to include the unique value(s) linked to the data stored in the volatile memory. The primary node can place the message in a computerized storage awaiting communication to the client that generated or otherwise provided the command to write the data to the volatile memory of the primary node. Thus, in an example, the primary node can compare the unique value included in the confirmation message against one or more unique values associated with one or more messages, in the computerized storage, awaiting communication to clients.

When the unique value(s) included with the confirmation message matches a unique value associated with the message stored in the computerized storage, in one example, the primary node releases the message from the computerized storage. In an example, releasing the message from the computerized storage includes moving the message from a client inaccessible portion of the computerized storage to a portion of the computerized storage that the client can access. In another example, releasing the message from the computerized storage includes marking the message for release from the computerized storage. Such marking can include toggling a flag bit associated with the message, such as toggling the flag bit from a hold message state to a release message state. In another example, releasing the message from the computerized storage includes moving the message to a separate unrestricted computerized storage that clients can access.

The message released from the computerized storage can be obtained by the client that provided the command to write data to the volatile memory. In one example, the client retrieves the message from the computerized storage. In another example, the primary node automatically communicates the message to the client subsequent to the message being released from the computerized storage. The message confirms to the client that the command to write data to the volatile memory was processed by the primary node. Specifically, in one example, the message confirms that the data was written to the volatile memory of the primary node. Advantageously, based on the use of the data structure coupled to the primary node, the message is received by the client after the data associated with the command to write data is persisted to the data structure. That is, the message is received by the client after the data is written to both the volatile memory and the data structure.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) providing confirmed data persistence for database systems that otherwise only provide asynchronous replication; (2) ensuring data is written to a primary node and a journal service before releasing client confirmations that data was written to memory of the primary node, directly reducing compute resource usage for handling client data inquiries related to data replication; (3) reducing tail-end data loss across failovers in systems that implement asynchronous replication, resulting in reduced compute resource usage during data recovery, and so forth. Additional benefits of various embodiments are also described herein.

FIG. 1 illustrates a computing environment 100 that implements one or more disclosed techniques that provide synchronous data replication, in accordance with at least one embodiment. In an embodiment, a client computing device 102 is in communication with a computing node 104. The client computing device can include at least one memory and one or more processing units (or processor(s)). The processor can be implemented as appropriate in hardware, computer-executable instructions, firmware, or combinations thereof. Computer-executable instructions or firmware implementations of the processor can include computer-executable or machine-executable instructions written in any suitable programming language to perform the various described functions. The computing node 104 can also include at least one memory and one or more processing units, similar to the client computing device 102.

The client computing device 102 can communicate with the computing node 104 over a suitable network. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system may include a web server for receiving requests and serving content in response thereto, although for other networks an alternative device serving a similar purpose could be used as would be apparent to one of ordinary skill in the art.

In an embodiment, the computing node 104 is in communication with a data storage node 106. The data storage node 106 can also include at least one memory and one or more processing units, similar to the client computing device 102. Similarly, communication between the computing node 104 and the data storage node 106 can be facilitated through a suitable network, such as the network between the client computing node 102 and the computing node 104.

In an embodiment, the client computing node 102 communicates a command 108 to the computing node 104. Thus, the computing node 104 can obtain the command 108. In an embodiment, the command 108 includes data. The data associated with the command 108 is for storage in a memory of the computing node 104. In an embodiment, the command 108 comprises the data, where the data is a key-value pair. The value portion of the key-value pair is the data for storage in the memory of the computing node 104. In an embodiment, the computing node 104 is a primary node of a database system that accepts read and write database commands from computing entities, such as the client computing device 102. The computing node 104 of the database system can be implemented to write data to volatile memory. In an embodiment, the computing node 104 is implemented with software of an in-memory database system.

In an embodiment, the computing node 104 obtained the command 108 and its associated data. The computing node 104 stores the data in memory. In an embodiment, the computing node 104 stores the data in volatile or non-volatile memory. In an embodiment, the computing node 104 stores the data in volatile memory to enable rapid response query of the stored data.

The computing node 104 can also generate a unique value that is associated with the data received in conjunction with the command 108. In an embodiment, the computing node can generate a plurality of unique values, and at least one of the plurality of unique values is associated with the data received in conjunction with the command 108. Therefore, in this description, one or more unique values can be associated with the data received in conjunction with the command 108. In an embodiment, the computing node 104 generates the unique value when the data is saved to memory. The unique value can be determined from a counter that increments by some value, such as one, when data is received by the computing node 104. This unique value can be considered metadata 110 linked to the data stored in the memory of the computing node 104. In an embodiment, the unique value can be a string generated by the computing node 104 in response to receiving the data from the client computing device 102. Thus, the metadata 110 can include the unique value or values associated with the data stored in the memory. The metadata 110 can also include other information to identify the data stored in the memory. The information to identify the data can include a hash value, and integer value, an alphanumeric value, and the like. The information to identify the data can be packaged with the data associated with the command 108.

The computing node 104 can generate a message 112 used to confirm that the computing node 104 obtained the command 108 to write the data to memory. The computing node 104 can generate the message 112 to include the metadata 110 linked to the data stored in the memory. The metadata 110, including the unique value, can be included in the message 112.

The message 112 can be conveyed or otherwise communicated to the client computing device 102. The message 112 can serve as a confirmation to the client computing device 102 that the command 108 was received and processed by the computing node 104. Furthermore, the message 112 can serve as a confirmation to the client computing device 102 that the data associated with the command 108 was stored in the memory of the computing node 104.

The computing node 104 can place the message 112 in a computerized storage awaiting communication to the client computing device 102 that generated or otherwise provided the command 108 to write the data to the memory of the computing node 104. The message 112 is held in the computerized storage temporarily based on the following.

In an embodiment, in addition to storing the data associated with the command 108 received from the client computing device 102, the computing node 104 also conveys the data to the data storage node 106. In an embodiment, the client computing device 102 conveys the data and the command 108 associated with the data to the data storage node 106. The data storage node 106 can include a data structure. In an embodiment, the data structure is a ledger database that provides a transparent, immutable, and cryptographically verifiable transaction log to track received and stored data. In addition to conveying the data to the data storage node 106, the computing node 104 also communicates the unique value, such as the metadata 110, to the data storage node 106. In an embodiment, the data, the command 108, and the metadata 110 are communicated to the data storage node 106 using a communication 114. The data storage node 106 stores the received data, and the data storage node 106 accounts for the stored data in its transaction log by at least writing the unique value therein and assigning an identifier to the unique value associated with the data received and stored in the data storage node 106.

In an embodiment, in response to receiving the communication 114, the data storage node 106 can generate a confirmation message 116 to confirm that the data received in the communication 114 was successfully stored in the data storage node 106. In an embodiment, the data storage node 106 extracts the metadata 110 included in the communication 114 and includes the metadata 110 in the confirmation message 116. In an embodiment, the metadata 110 includes at least one unique value generated by the computing node 104.

The data storage node 106 communicates the confirmation message 116 to the computing node 104. The computing node 104 can analyze the confirmation message 116 to determine the unique value or values included in the confirmation message 116. In an embodiment, the computing node 104 uses the unique value included in the confirmation message 116 to search for the message 112 that has an associated unique value that matches the unique value included in the confirmation message 116.

When the unique value included with the confirmation message 116 matches the unique value associated with the message 112, in an embodiment, the computing node 104 releases the message 112 for delivery to the client computing device 102. In an example, releasing the message 112 includes moving the message from a client inaccessible portion of a computerized storage to a portion of the computerized storage that the client computing device 102 can access. In another example, releasing the message 112 from the computerized storage includes marking the message 112 for release from the computerized storage. Such marking can include toggling a flag bit associated with the message 112, such as toggling the flag bit from a hold message state to a release message state. In another example, releasing the message 112 from the computerized storage includes moving the message to a separate unrestricted computerized storage, of the computing node 104, that clients can access.

According to the techniques described in the foregoing, the data included with the command 108 is persisted to the data storage node 106 before the message 112 is released to the client computing device 102. Thus, the described techniques provide synchronous replication for the data included with the command 108.

Figure 2:
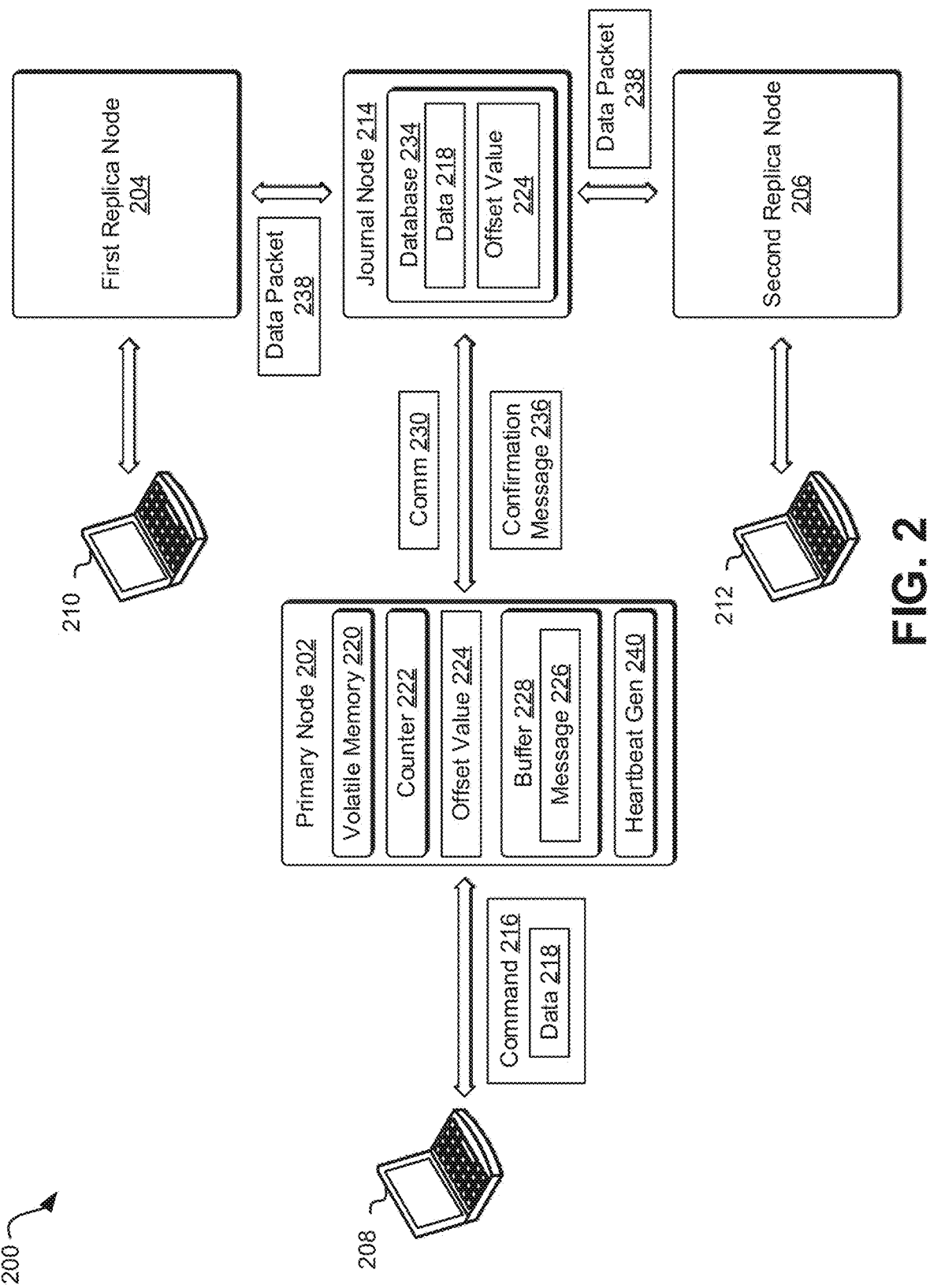
FIG. 2 illustrates a computing environment that implements one or more disclosed techniques that provide data replication, in accordance with at least one embodiment.

FIG. 2 illustrates a computing environment 200 that implements one or more disclosed techniques that provide data replication, in accordance with at least one embodiment. In an embodiment, the computing environment 200 depicts a database system comprising a primary node 202, a first replica node 204, and a second replica node 206. The database system can be managed by an online service provider. The number of illustrated replica nodes is provided by way of example only. Specifically, any number of replica nodes can be coupled to the primary node 202. In an embodiment, the primary node 202 accepts read and write commands from at least one client computing device 208. Furthermore, in an embodiment, the first replica node 204 accepts read commands from at least one client computing device 210 and the second replica node 206 accepts read commands from at least one client computing device 212.

In an embodiment, the first replica node 204 and the second replica node 206 can include some or all of the illustrated and described operational features, hardware, and software of the primary node 202. Therefore, based on a failure or overload of the primary node 202, the first replica node 204 and the second replica node 206 can assume the role of the primary node 202.

In an embodiment, data stored in a memory of the primary node 202 is replicated to the first replica node 204 and the second replica node 206. The memory that the primary node 202 uses to stores the data can be a volatile memory. Similarly, the memory of the first replica node 204, which stores the replicated data from the primary node 202, can be a volatile memory. The same is true for the second replica node 206.

In an embodiment, a journal node 214 is disposed between the primary node 202 and the nodes 204 and 206. The journal node 214 serves to receive data from at least the primary node 202. The data received from the primary node 202 is to be replicated to the first replica node 204 and the second replica node 206. Furthermore, the journal node 214 facilitates snapshotting (i.e., full or near full synchronization) of data hosted by the journal node 214 and one or more servers, storing snapshot data, coupled to the journal node 214, should the primary node 202 fail or if a new replica node joins the computing environment 200. In an embodiment, the journal node 214, or another node coupled to the journal node 214, periodically generates snapshot data sets of data in volatile memory. The snapshot data sets can be stored in one or more external computerized storages coupled to the journal node 214. Thus, when a node fails or a new node is added to the computing environment 200, the new node or the recovered failed node connects to the external computerized storage and retrieves and stores the data from a snapshot data set, in one example the most recent snapshot data set stored in the external computerized storage, in its memory (e.g., volatile memory). The recovered failed node or the new node then requests, from the journal node 214, any new data processed by the journal node 214 after the most recent snapshot data set was generated. In addition, the journal node 214 serves to provide partial synchronization of data hosted by the journal node 214 or servers coupled to the journal node 214 should the primary node 202 fail or reach an overloaded state due to becoming functionally compromised.

In an embodiment, the client computing device 208 communicates a write command 216 to the primary node 202. The write command 216 can include data 218 for storage in a volatile memory 220. The data 218 can be associated with a key-value pair linked to the write command 216.

The primary node 202 can store the data 218 in the volatile memory 220. In an embodiment, the primary node 202 increments a counter 222 to generate a unique value, such as an offset value 224. In an embodiment, the primary node 202 generates multiple unique values, such as the offset value 224 and an offer ID, such as a string value generated when data is stored by the primary node 202. The primary node 202 associates the offset value 224 with the data 218. In an embodiment, the primary node 202 can also associate the offer ID with the data 218. In an embodiment, the primary node 202 generates an offset value that is linked to each data that is received and processed by the primary node 202. When replica nodes connect to the journal 214, they can use a partial sync command in order to send their old primary replication identification and the offsets they processed so far to the journal 214. This way the journal node 214 provides the incremental data needed, based on the offset from the connecting replica node, to sync the connecting replica node's data set to the data set of the primary node 202. However, if the replica node is referring to a history (i.e., replication identification) which is no longer known, then a full data resynchronization happens (i.e., snapshot), facilitated through the journal node 214 and a snapshot of data stored on one or more external computerized.

In an embodiment, the primary node 202 generates a message 226. The message 226 can be stored in a buffer 228 of the primary node 202. In an embodiment, the message 226 includes the offset value 224. Furthermore, the message can include the offer ID. In an example, the message 226 can also include other information that identifies the data 218, such as identification information included with the data 218 when it was received by the primary node 202. Furthermore, the message 226 can be marked, such as by toggling a flag bit, as reserved for future release to the client computing device 208. Alternatively, in an embodiment, the message 226 can be stored in a portion of the buffer 228 that is inaccessible by the client computing device 208.

In an embodiment, the data 218 stored in the volatile memory 220 can be marked read restricted awaiting confirmation that the journal 214 received the data 218. In an embodiment, data marked as read restricted cannot be read by clients interfacing with the primary node 202. The data 218 can be marked as read restricted using a toggleable flag bit associated with the data 218. In an embodiment, the toggleable flag bit is applied to a key of the data 218, where the data 218 is part of a key-value pair. In another embodiment, the data 218 can be read restricted by placing the data 218 and a portion of the volatile memory 220 that is inaccessible to the client computing device 208.

The primary node 202 can generate a communication 230 in response to receiving the data 218. The communication 230 can include the data 218 and the offset value 224. In an example, the communication 230 can include the data 218, the write command 216, and the offset value 224. In an embodiment, the communication 230 can also include the offset ID. In an embodiment, the communication 230 is transmitted to the journal node 214. The journal node 214 processes the communication 230 and stores the data 218 in a database 234. In an embodiment, the database 234 is a ledger database that provides a transparent, immutable, and cryptographically verifiable transaction log to verifiably track all data stored in the database 234. Additionally, in an embodiment, the journal node 214 stores the offset value 224, and if included, the offset ID. The journal node 214 can link the offset value 224 to the data 218. Specifically, in an example, the journal node 214 can append the offset value 224 to the data 218. The offset ID can also be associated with the data 218.

The journal node 214 can generate a confirmation message 236. The confirmation message 236 can be generated by the journal node 214 to include information specifying that the data 218 was received by the journal node 214. In addition, the confirmation message 236 can include the offset value 224. In an embodiment, the confirmation message 236 can also include the offset ID. The confirmation message 236 is transmitted to the primary node 202. In addition, the journal node 214 generates a data packet 238 that includes the data 218 and the offset value 224. In an embodiment, the data packet 238 can also include the offset ID. The data packet 238 is communicated to the first replica node 204 and the second replica node 206. Each of the replica nodes 204 and 206, in an embodiment, reads the data packet 238 to retrieve the data 218 and the offset value 224 and any other associated information. The replica nodes 204 and 206 store the data 218 and their respective memories. In an embodiment, the first replica node 204 includes a volatile memory that replicates the data stored in the volatile memory 220 of the primary node 202. Furthermore, the second replica node 206 includes a volatile memory that replicates the data stored in the volatile memory 220 of the primary node 202. Replication of the data stored in the volatile memory 220 of the primary node 202 is facilitated through the journal node 214. The replica nodes 204 and 206 also store the received offset value 224. The replica nodes 204 and 206 use the offset value 224 is a reference to track the most recent data received from the journal node 214.

In an embodiment, the confirmation message 236 is received by the primary node 202. The confirmation message 236 facilitates release of the message 226 stored in the buffer 228. As discussed in the foregoing, the message 226 can confirm to the client computing device 208 that the command 216 in the data 218 were processed by the primary node 202. In particular, the client computing device 208 can use the message 226, once obtained, to confirm that the primary node 202 stored the data 218 in the volatile memory

220. In addition, the confirmation message 236 can cause the primary node 202 identify the data 218 and readable by the client computing device 208.

The primary node 202 analyzes the confirmation message 236 to retrieve at least the offset value 224 included therein by the journal node 214. The primary node 202 can also identify the offer ID, when included with the confirmation message 236. The primary node 202 searches the buffer 228 to locate the message 226. In an embodiment, the primary node 202 compares the offset value 224 against a plurality of offset values and associated messages stored in the buffer 228 to locate the message 226. The primary node 202 can also use the offer ID to identify or locate the message 226. In this example, search of the buffer 228 reveals that the message 226 has an associated offset value 224 that matches the offset value 224 included in the confirmation message 236. The determined match of offset values causes the primary node 202 to release the message 226 for communication or retrieval by the client computing node 208. In an embodiment, the primary node 202 moves the message 226 from a protected portion of the buffer 228, which is inaccessible by the client computing device 208, to a portion of the buffer 228 that can be accessed by the client computing device 208. Alternatively, in an embodiment, the primary node 202 can mark the message 226 as available for dissemination to the client computing device 208. For example, the primary node 202 can alter a flag bit of the message 226 to indicate that the message 226 is releasable from the buffer 228 for communication to or retrieval by the client computing device 208. Furthermore, in an embodiment, based on the confirmation message 236 and locating the message 226, the primary node 202 removes the read restricted state associated with the data 218 stored in the volatile memory 220.

In an embodiment, the primary node 202 can determine when the confirmation message 236 is not received within a predetermined period of time. Alternatively or in addition, the primary node 202 can detect that the journal node 214 is refusing to accept requests, from the primary node 202, to store data. In the event that the confirmation message 236 is not received within the predetermined period of time, or if the journal node 214 is refusing to accept data from the primary node 202, the primary node 202 can flush the volatile memory 220 to eliminate any data stored within the volatile memory 220. The primary node 202 then communicates the request to the journal node 214 to trigger receiving data persisted by the journal node 214. In response, in an embodiment, the journal node 214 communicates, to the primary node 202, data persisted by the journal node 214. In an embodiment, the journal node 214 communicates the data and the commands associated with that data to the primary node 202. The primary node 202 processes the data and commands and stores the data in the volatile memory 220. In an embodiment, after flushing the volatile memory 220 and receiving the data persisted by the journal node 214, the primary node 220 becomes a replica node that processes data of a new primary node associated with the computing environment 200.

According to the techniques described in the foregoing, the data 218 included with the command 216 is persisted to the journal node 214 before the message 226 is released to the client computing device 208. Thus, the described techniques provide synchronous replication for the data 218 included with the command 216. In an embodiment, the described techniques that provide synchronous replication are applied to a database system initially provisioned for asynchronous replication. Specifically, in an embodiment, the described techniques that provide synchronous replication are applied to a database system that provide asynchronous replication, such that the database system is converted to a database system that provide synchronous replication.

In an embodiment, if the primary node 202 fails or otherwise is unable to properly function as the primary node 202, the data set stored in the database 234 of the journal node 214 enables one of the replica nodes 204 and 206 to assume the read and write responsibilities of the primary node 202. In an example, the primary node 202 implements a heartbeat generator 240. The heartbeat generator 240 can be configured to generate a heartbeat signal at a beginning or an end of a predetermined time interval that repeats indefinitely. In an embodiment, a heartbeat signal is generated consistently and constantly while the primary node 202 is operational. The heartbeat signals are conveyed to the replica nodes 204 and 206. In an embodiment, the heartbeat signals are conveyed to the replica nodes 204 and 206 through the journal node 214. The heartbeat signals indicate to the replica nodes 204 and 206 that the primary node 202 remains online and is functioning properly.

In an embodiment, to illustrate primary node election in the event that the primary node 202 stops generating heartbeat signals from the heartbeat generator 240, due to failure for example, the following disclosure is provided. Upon detecting the absence of heartbeat signals from the primary node 202, over some predetermined time period (e.g., 1 second), one or more of the replica nodes 204 and 206 will attempt to write data to the journal node 214. In an embodiment, the journal node 214 will attempt to process the first received data generated by one or more of the replica nodes 204 and 206. In an embodiment, the data conveyed to the journal node 214 will include the last offset value received by the first replica node 204 or the second replica node 206. The journal node 214 compares the offset value to its most recent offset value received from the primary node 202. When the offset values match, the journal node 214 is able to confirm to the replica node 204 or the replica node 206 that it includes an up-to-date dataset and can assume the responsibilities of a primary node. However, if the offset values do not match, thereby indicating that the replica node 204 or the replica node 206 does not include an up-to-date dataset, the journal node 214 can convey the backlogged data to the replica node 204 or the replica code node 206. The replica node 204 or the replica node 206 can use the backlogged data to update its dataset so that it can assume the responsibilities of a primary node 202. The journal node 214, in one example, accommodates connecting the replica node 204 or the replica node 206, whichever did not become the new primary node, to the new primary node.

FIG. 3 illustrates a flow diagram 300 including various processing acts, implemented by a system environment with one or more computing devices or nodes, which provide synchronous data replication. In some implementations, the acts of the flow diagram 300 are executed by one or more computing devices illustrated in FIGS. 1-2 and 6. The illustrated computing devices may execute computer-executable instructions incorporating at least some of the processing acts of the flow diagram 300 to provide synchronous data set replication between a primary node and at least one replica node coupled to the primary node through a journal node that consumes data from the primary node.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 302, a database command is obtained. In an embodiment, the database command can be obtained by the computing node 104 or the primary node 202. The database command can be a command to store data in memory. In an embodiment, the database command is associated with a database system that stores data, which can be queried, in a volatile memory. Such a database system can be referred to as an in-memory database system. In an embodiment, the database command comprises a key-value pair, where the value portion comprises the data for storage in the memory. In an example, the database command is received by the computing node 104 or the primary node 202 via a communication from a client computing device, such as the client computing device 102 or the client computing device 208.

At 304, the data associated with the database command is stored in memory. In an embodiment, the data is stored in a volatile memory of the computing node 104 or the volatile memory 220 of the primary node 202. In some embodiments, the stored data is searchable, such as searchable via a database table or other data structure associated with the data. In addition, in an embodiment, unique metadata can be linked to the data stored in memory. The unique metadata can be a unique value generated by the computing node 104 or the client computing device 208 when data is received thereby. In an embodiment, the unique metadata at least comprises an offset value generated by a monotonically increasing counter available to the computing node 104 or the primary node 202. In an embodiment, the unique metadata can comprise the offset value and an offer ID. In an embodiment, each data received by the computing node 104 or the primary node 202 is assigned an offset value.

At 306, a response to the database command is generated. In an embodiment, the computing node 104 or the primary node 202 generates the response. The response can include the unique metadata. In an embodiment, the unique metadata is associated with the response such that the response is searchable in a stored state via the unique metadata associated with the response. The response and the associated unique metadata can be stored in a buffer or other suitable computerized storage. In an embodiment, the computing node 104 or the primary node 202 stores the response and the associated unique metadata in a buffer that is coupled to a computing entity, such as a client computing device, that provided the database command and the data for storage and volatile memory. In an embodiment, at the outset, the response is stored inaccessible to the client computing device.

At 308, a confirmation that the data associated with the database command was stored in a data structure is obtained. In an embodiment, the confirmation is obtained by the computing node 104 or the client computing device 208. The confirmation can be generated by a service managing the data structure. The service can be coupled, remotely, to the computing node 104 or the primary node 202. In an embodiment, the service managing the data structure is a service associated with the data storage node 106 or the journal node 214. In an example, the service managing the data structure or the journal node 214 generates the confirmation obtained or received by the computing node 104 or the primary node 202.

At 310, the response is released. In an embodiment, the response is released to the client computing device that generated the database command. In an example, the response is released based on the confirmation that the data associated with the database command was stored in a data structure. In an embodiment, the response is released based on comparing a unique value obtained in the confirmation provided at 308 against a plurality of unique values associated with a plurality responses stored in a buffer of the computing node 104 or the primary node 202. When the comparison process reveals that the unique value(s) obtained from the confirmation matches a unique value(s) associated with a response stored in the buffer, that response is determined by the computing node 104 or the primary node 202 as being releasable. In an embodiment, the released response can be automatically communicated to the client computing device that generated the database command. Alternatively, the released response can be retrieved by the client computing device that generated the database command, such as when the client computing device performs an I/O operation on the buffer in the computing node 104 or the primary node 202.

Figure 4:
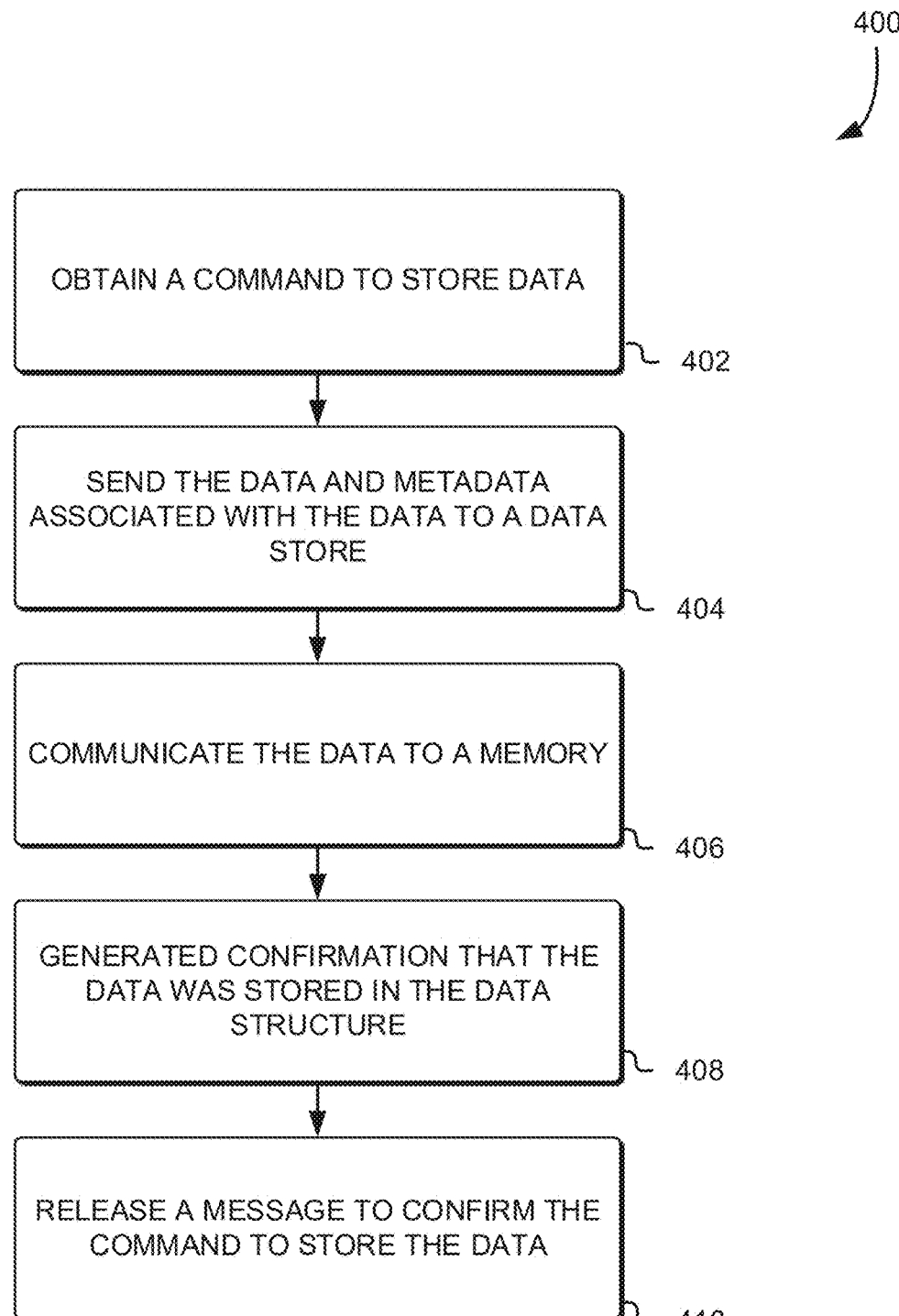
FIG. 4 illustrates a flow diagram including various processing acts, implemented by a system environment with one or more computing devices or nodes, which provide synchronous data replication, in accordance with at least one embodiment.

FIG. 4 illustrates a flow diagram 400 including various processing acts, implemented by a system environment with one or more computing devices or nodes, which provide synchronous data replication. In some implementations, the acts of the flow diagram 400 are executed by one or more computing devices illustrated in FIGS. 1-2 and 6. The illustrated computing devices may execute computer-executable instructions incorporating at least some of the processing acts of the flow diagram 400 to provide synchronous data set replication between a primary node and at least one replica node coupled to the primary node through a journal node that consumes data from the primary node.

At 402, a command is obtained. In an embodiment, the command can be obtained by the computing node 104 or the primary node 202. The command can be a command to store data in memory. In an embodiment, the command is associated with a database system that stores data, which can be queried, in a volatile memory. Such a database system can be referred to as an in-memory database system. In an embodiment, the command comprises a key-value pair, where the value portion comprises the data for storage in the memory. In an example, the command is received by the computing node 104 or the primary node 202 via a communication from a client computing device, such as the client computing device 102 or the client computing device 208.

At 404, the data and metadata associated with the data is sent to a data structure. In an embodiment, the computing node 104 or the primary node 202 sends the data and the metadata to the data storage node 106 or the journal node 214. In an example, the data storage node 106 or the journal node 204 is to store the data in storage of the data storage node 106 or the journal node 204 or an external computerized storage coupled to the data storage node 106 or the journal node 204. The metadata can be a unique value generated by the computing node 104 or the client computing device 208 when data is received thereby. In an embodiment, the metadata at least comprises an offset value generated by a monotonically increasing counter available to the computing node 104 or the primary node 202. In an embodiment, the metadata can also include an offer ID. In an embodiment, each data received by the computing node 104 or the primary node 202 is assigned an offset value.

At 406, the data is communicated to a memory. In an embodiment, the journal node 204 or the data storage node 106 communicates the data to a replica storage node, such as the first replica node 204 or the second replica node 206. The replica storage node receives the data and stores it in a memory of the node. In an embodiment, the replica node stores the data in a volatile memory.

At 408, a confirmation that the data was stored in the data structure is generated. In an embodiment, the confirmation is generated to include at least the metadata that was sent to the data structure. In an embodiment, the confirmation can be generated immediately after the data structure receives the data, such as in advance of storing the data. In an embodiment, the data storage node 106 or the journal node 214 generates the confirmation. The confirmation can be communicated to the computing node 104 or the primary node 202.

At 410, a message to confirm the command to store the data is released. In an embodiment, releasing the message is based on the confirmation that the data was stored in the data structure. In an embodiment, the confirmation that the data associated with the command was stored in the data structure is obtained. In an embodiment, the confirmation is obtained by the computing node 104 or the client computing device 208. The confirmation can be generated by a service managing the data structure. The service can be coupled, remotely, to the computing node 104 or the primary node 202. In an embodiment, the service managing the data structure is a service associated with the data storage node 106 or the journal node 214. In an example, the service managing the data structure or the journal node 214 generates the confirmation obtained or received by the computing node 104 or the primary node 202.

In an embodiment, the message is released to the client computing device that generated the command. In an example, the message is released based on the confirmation that the data associated with the command was stored in a data structure. In an embodiment, the message is released based on comparing metadata obtained in the confirmation at 408 against metadata associated with a plurality messages stored in a buffer of the computing node 104 or the primary node 202.

FIG. 5 illustrates a flow diagram 500 including various processing acts, implemented by a system environment with one or more computing devices or nodes, which provide synchronous data replication. In some implementations, the acts of the flow diagram 500 are executed by one or more computing devices illustrated in FIGS. 1-2 and 6. The illustrated computing devices may execute computer-executable instructions incorporating at least some of the processing acts of the flow diagram 500 to provide synchronous data set replication between a primary node and at least one replica node coupled to the primary node through a journal node that consumes data from the primary node.

At 502, data is written or stored in a volatile memory. In an embodiment, the data is written to the volatile memory in response to receiving a command to write data in memory. In an embodiment, the command is associated with a database system that stores data, which can be queried, in a volatile memory. Such a database system can be referred to as an in-memory database system. In an embodiment, the command comprises a key-value pair, where the value portion comprises the data for storage in the memory. In an example, the command is received by the computing node 104 or the primary node 202 via a communication from a client computing device, such as the client computing device 102 or the client computing device 208.

At 504, metadata is generated. In an embodiment, the metadata is associated with the data written to the volatile memory. The metadata can comprise a unique value generated by the computing node 104 or the client computing device 208 when data is received thereby. In an embodiment, the unique metadata at least comprises an offset value generated by a monotonically increasing counter available to the computing node 104 or the primary node 202. In an embodiment, the unique metadata also comprises an offer ID. In an embodiment, each data received by the computing node 104 or the primary node 202 is assigned an offset value. Furthermore, in an example, each data received by the computing node 104 or the primary node 202 is assigned the offer ID.

At 506, a message usable to confirm that the data was written to the volatile memory is stored. In an example, the metadata is linked to the message. In an embodiment, the computing node 104 or the primary node 202 generates the message. The message can include the metadata. In an embodiment, the metadata is associated with the message such that the message is searchable in a stored state via the unique metadata associated with the response. The response and the associated metadata can be stored in a buffer or other suitable computerized storage. In an embodiment, the computing node 104 or the primary node 202 stores the message and the associated metadata in a buffer that is coupled to a computing entity, such as a client computing device, that provided a database command and the data to be written to the volatile memory. In an embodiment, at the outset, the message is stored inaccessible to the client computing device.

At 508, the data and the metadata are communicated to a data structure to store the data. In an embodiment, the computing node 104 or the primary node 202 sends the data and the metadata to the data storage node 106 or the journal node 214. In an example, the data storage node 106 or the journal node 204 is to store the data in storage of the data storage node 106 or the journal node 204 or an external computerized storage coupled to the data storage node 106 or the journal node 204. The metadata can be a unique value(s) generated by the computing node 104 or the client computing device 208 when data is received thereby. In an embodiment, the metadata at least comprises an offset value generated by a monotonically increasing counter available to the computing node 104 or the primary node 202. The metadata can also include the offer ID. In an embodiment, each data received by the computing node 104 or the primary node 202 is assigned an offset value.

At 510, a confirmation that the data was stored by the data structure is obtained. In an embodiment, the confirmation includes the metadata associated with the data. In an embodiment, the data storage node 106 or the journal node 214 generates the confirmation. The confirmation can be communicated to the computing node 104 or the primary node 202.

At 512, in response to the confirmation, the stored message is identified using the metadata included with the confirmation. In an embodiment, the computing node 104 or the primary node 202 uses the metadata included in the confirmation to search for a stored message that has associated metadata that matches the metadata included in the confirmation. In an embodiment, the stored message is released based on comparing metadata obtained in the confirmation provided at 510 against metadata associated with a plurality messages stored in a buffer of the computing node 104 or the primary node 202. When the comparison process reveals that the metadata obtained from the confirmation matches metadata associated with a message stored in the buffer, that message is determined by the computing node 104 or the primary node 202 as being releasable. In an embodiment, the released message can be automatically communicated to the client computing device that requested to write data in the volatile memory. Alternatively, the released message can be retrieved by the client computing device that generated the request to write data in the volatile memory, such as when the client computing device performs an I/O operation on the buffer in the computing node 104 or the primary node 202.

Figure 6:
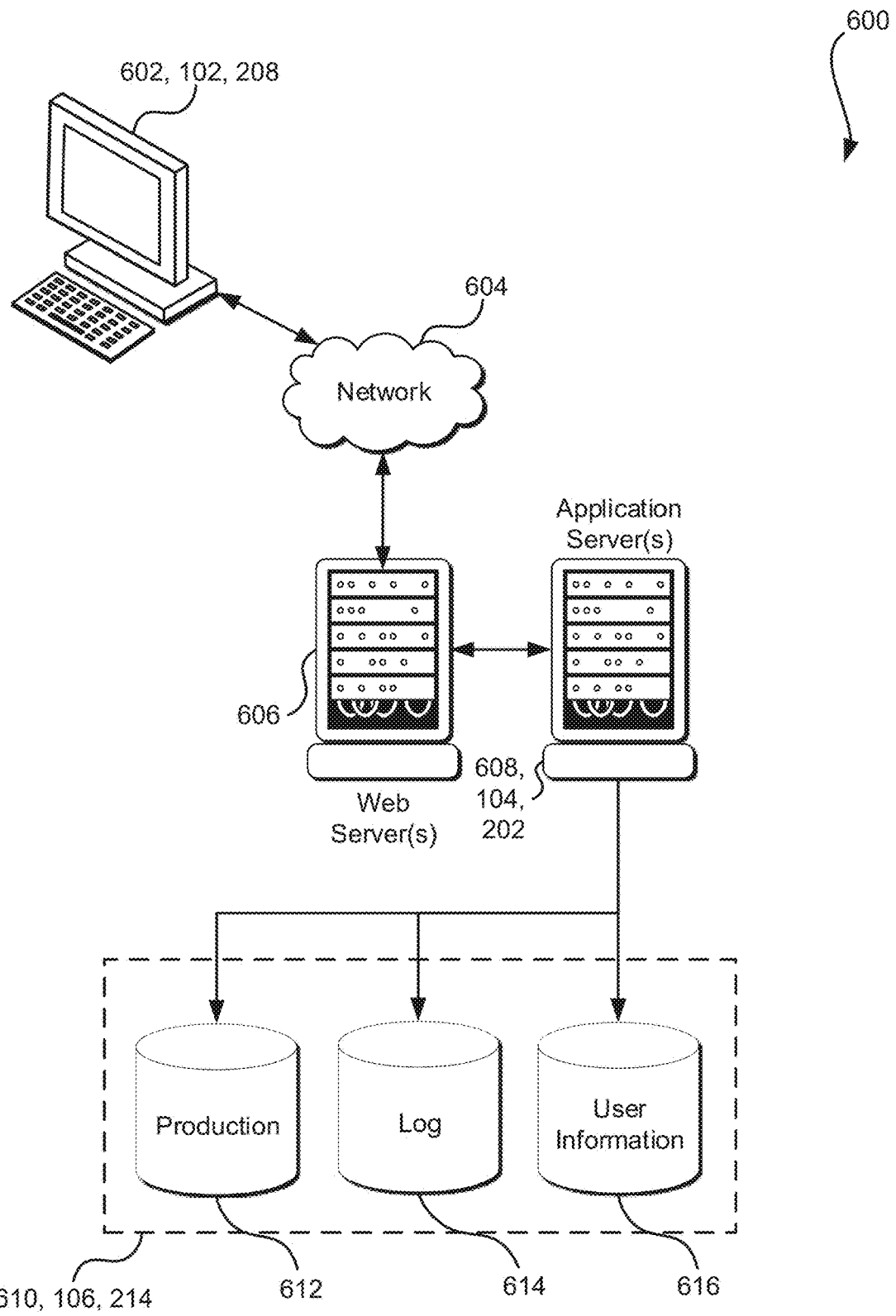
FIG. 6 illustrates a system in which various embodiments can be implemented.

FIG. 6 illustrates aspects of an example system 600 for implementing aspects in accordance with an embodiment. As will be appreciated, although a web-based system is used for purposes of explanation, different systems may be used, as appropriate, to implement various embodiments. Furthermore, as should be understood, at least one or more of the systems illustrated in the example system 600 can implement the various computing devices and nodes illustrated and described herein.

In an embodiment, the system 600 includes an electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 602 and the application server 608, in an embodiment, is handled by the web server using PUP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol.

Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java©, C, C# or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
obtaining a database command to store data in a memory associated with an in-memory database system;
in response to the database command, storing the data in the memory;
linking unique metadata to the data;
generating a response and including the unique metadata in the response;
storing the response including the unique metadata in a buffer associated with a computing entity that provided the database command, the response stored in a portion of the buffer inaccessible to the computing entity, the portion of the buffer inaccessible to the computing entity provided by a first portion of a computer storage;
storing the data in a data structure hosted by a storage node;
obtaining a confirmation that the data was stored in the data structure, the confirmation including at least the unique metadata, the confirmation provided in a message from the storage node;
analyzing the confirmation to identify the unique metadata included in the confirmation;
based on identifying the unique metadata included in the confirmation, searching the buffer to locate the response including the unique metadata that matches the unique metadata included in the confirmation; and
releasing the response stored in the buffer by at least moving the response to another portion of the buffer accessible to the computing entity, the other portion of the buffer provided by a second portion of the computer storage.

2. The computer-implemented method according to claim 1, wherein the database command is a command to write the data to volatile memory, the data is associated with a value of a key-value pair, and the memory is a volatile memory of a primary node that accepts commands to perform database reads and database writes from computing entities.

3. The computer-implemented method according to claim 1, further comprising communicating the data and the unique metadata to the data structure, the data and the unique metadata communicated with a request to store the data in the data structure, and wherein the unique metadata is an offset value generated in response to obtaining the database command to store the data in the memory.

4. The computer-implemented method according to claim 1, wherein the response is a confirmation message to confirm that the database command was processed and the data was stored in the memory, and wherein storing the response in the buffer comprises storing the response in the portion of the buffer allocated for temporary storage of responses awaiting release, pending confirmation of data storage in the data structure.

5. A system, comprising:
one or more processors; and
memory that stores computer-executable instructions that are executable by the one or more processors to cause the system to:
write data to a volatile memory;
generate metadata associated with the data written to the volatile memory;
store a message usable to confirm that the data was written to the volatile memory, the metadata linked to the message, the message stored in a portion of a computer storage inaccessible to at least one computing entity connectable to the system;
communicate the data and the metadata to a data structure to store the data;
store the data in a data structure hosted by a storage node;
obtain a confirmation that the data was stored in the data structure, the confirmation obtained in a message from the storage node and including at least the metadata associated with the data;
in response to the confirmation that the data was stored in the data structure, identify the stored message using the metadata included with the confirmation identifying the stored message including at least determining the metadata linked to the message matches the metadata included with the confirmation; and
based, at least in part, on the confirmation that the data was stored in the date structure, release the message by at least moving the message stored in the portion of a computer storage inaccessible to the at least one computing entity connectable to the system to another portion of the computer storage accessible to the at least one computer entity connectable to the system.

6. The system according to claim 5, wherein the metadata associated with the data written to the volatile memory comprises a unique value, the unique value generated and associated with the data based on obtaining the data written to the volatile memory.

7. The system according to claim 5, wherein the stored computer-executable instructions that are executable by the one or more processors are to further cause the system to:
generate the message usable to confirm that the data was written in the volatile memory, the message comprising the metadata associated with the data written to the volatile memory, the metadata comprising an offset value generated when the data was written to the volatile memory.

8. The system according to claim 5, wherein the stored computer-executable instructions, that are executable by the one or more processors to cause the system to identify the stored message using the metadata included with the confirmation, are to cause the system to:

analyze the confirmation, that includes the metadata associated with the data, to identify the metadata;

use the identified metadata to search a computer storage to determine metadata stored by the computer storage that matches the identified metadata; and based on determining the metadata stored by the computer storage matches the identified metadata from the confirmation, locate the stored message.

9. The system according to claim 8, wherein the metadata associated with the data written to the volatile memory comprises a unique value, the unique value generated and associated with the data based on obtaining the data written to the volatile memory.

10. The system according to claim 5, wherein the stored computer-executable instructions, that are executable by the one or more processors to cause the system to identify the stored message using the metadata included with the confirmation, are to cause the system to:

mark the data as unreadable pending the confirmation that the data was stored in the data structure; and in response to the confirmation that the data was stored in the data structure, mark the data as readable by at least one computing entity coupled to the computer system.

11. The system according to claim 5, wherein the data and the metadata are communicated by a primary node that accepts commands to perform database reads and database writes from computing entities, and wherein the stored computer-executable instructions that are executable by the one or more processors are to further cause the system to forward the data to a secondary node that is restricted to accepting commands to perform database reads, forwarding the data to the secondary node performed by a service that manages the data structure that stores the data.

12. The system according to claim 5, wherein the stored computer-executable instructions, that are executable by the one or more processors to cause the system to identify the stored message using the metadata included with the confirmation, are to cause the system to:

generate a heartbeat signal at a beginning or end of a predefined time interval, the heartbeat signal usable to confirm a primary node that wrote the data to the volatile memory is operational;

communicate the heartbeat signal to a service that manages the data structure that stores the data, the service that manages the data structure to forward the heartbeat signal to at least one secondary node, the secondary node comprising another volatile memory that stores a copy of the data stored in the volatile memory of the primary node; and cause the secondary node to accept commands to perform database writes based at least on a determination that the primary node is not generating heartbeat signals, the determination made by the secondary node based on a recognition that heartbeat signals have not been observed over a predetermined period of time.

13. A non-transitory computer-readable storage medium storing thereon executable instructions that, as a result of being executed by one or more processors of a computer system, cause the computer system to:

obtain a command to store data in a first volatile memory, the data associated with the command;

send the data and metadata associated with the data to a data structure, the data structure to store the data;

communicate the data to a second volatile memory;

generate a confirmation that the data was stored in the data structure, the confirmation including at least the metadata;

communicate the confirmation to a computer-implemented node that obtained the command to store the data in the first volatile memory;

based at least on the communicated confirmation, locate a message using the metadata included with the confirmation by at least determining the message includes the metadata included with the confirmation, the message stored in a portion of a computer storage inaccessible to at least one computing entity; and identifying the stored message including at least determining the metadata linked to the message matches the metadata included with the confirmation release the message to confirm the command to store the data in the first volatile memory was obtained, releasing the message comprising moving the message to another portion of the computer storage accessible to the at least one computing entity.

14. The non-transitory computer-readable storage medium of claim 13, wherein the command to store data in the first volatile memory is a database command to write data in the first volatile memory, the first volatile memory associated with an in-memory database system that stores data in the first volatile memory and accepts read commands on the data stored in the first volatile memory.

15. The non-transitory computer-readable storage medium of claim 13, wherein the executable instructions that, as a result of being executed by one or more processors of a computer system, further cause the computer system to:

store the data in the first volatile memory; and generate the message to confirm the command to store the data in the first volatile memory was obtained, the message comprising the metadata associated with the data and the metadata comprising an offset value generated when the data was stored in the first volatile memory.

16. The non-transitory computer-readable storage medium of claim 13, wherein the executable instructions that, as a result of being executed by one or more processors of a computer system, further cause the computer system to:

generate a heartbeat signal at a beginning or end of a predefined time interval, the heartbeat signal usable to confirm an operational state of at least a portion of the computer system;

communicate the heartbeat signal to a service that manages the data structure that stores the data, the service that manages the data structure to forward the heartbeat signal to at least one replica node, the replica node comprising the second volatile memory that stores a copy of the data stored in the first volatile memory; and cause the replica node to accept commands to perform database writes based on a determination that the portion of the computer system is not generating heartbeat signals, the determination made by the replica node based on a recognition that heartbeat signals have not been observed over a predetermined period of time.

17. The non-transitory computer-readable storage medium of claim 13, wherein the metadata associated with the data comprises a unique value, the unique value generated and associated with the data based on obtaining the command to store the data in the first volatile memory.

18. The non-transitory computer-readable storage medium of claim 13, wherein the executable instructions that, as a result of being executed by one or more processors of a computer system, further cause the computer system to:

analyze the confirmation that includes the metadata to identify the metadata;

use the identified metadata to search a computer storage to determine metadata stored by the computer storage that matches the identified metadata; and based on determining the metadata stored by the computer storage matches the identified metadata from the confirmation, locate the message.

19. The non-transitory computer-readable storage medium of claim 13, wherein the executable instructions that, as a result of being executed by the one or more processors of the computer system, cause the computer system to release the message further cause the computer system to release the message to a computing entity that generated the command to store the data in the first volatile memory.

20. The non-transitory computer-readable storage medium of claim 13, wherein the first volatile memory is associated with a primary database node that stores database data in the first volatile memory and the second volatile memory is associated with a secondary database node that stores database data in the second volatile memory, and wherein the second volatile memory stores a data set replicated from the data set stored in the first volatile memory.

21. The computer-implemented method according to claim 1, wherein the database command is obtained by a computer-implemented node and the memory and the buffer are associated with the computer-implemented node, and the confirmation that the data was stored in the data structure is obtained by the computer-implemented node.

22. The system according to claim 5, wherein writing the data, generating the metadata, and storing the message are performed by a first computer-implemented node, and the storage node is arranged between the first computer-implemented node and at least a second computer-implemented node to store the data.

23. The non-transitory computer-readable storage medium of claim 13, wherein the second volatile memory is associated with another computer-implemented node.

* * * * *